United States Patent [19]
Leontiades et al.

[11] Patent Number: 5,909,667
[45] Date of Patent: Jun. 1, 1999

[54] METHOD AND APPARATUS FOR FAST VOICE SELECTION OF ERROR WORDS IN DICTATED TEXT

[75] Inventors: Kyriakos Leontiades, Boca Raton; Kris Coe, Lighthouse Point, both of Fla.

[73] Assignee: International Business Machines Corporation, Armonk, N.Y.

[21] Appl. No.: 08/812,387

[22] Filed: Mar. 5, 1997

[51] Int. Cl.[6] ....................................................... G10L 5/06
[52] U.S. Cl. .......................... 704/275; 704/251; 704/235
[58] Field of Search ................................... 704/235, 251, 704/275

[56] References Cited

U.S. PATENT DOCUMENTS

| | | |
|---|---|---|
| 4,914,704 | 4/1990 | Cole et al. . |
| 5,031,113 | 7/1991 | Hollerbauer . |
| 5,231,670 | 7/1993 | Goldhor et al. . |
| 5,377,303 | 12/1994 | Firman ..................................... 704/275 |
| 5,386,494 | 1/1995 | White ....................................... 704/275 |

FOREIGN PATENT DOCUMENTS

0 644 680 A2  8/1994  European Pat. Off. .

*Primary Examiner*—David R. Hudspeth
*Assistant Examiner*—Robert Louis Sax
*Attorney, Agent, or Firm*—Quarles & Brady

[57] ABSTRACT

A computer voice operated dictations system having a text editing mode provided for editing dictated text. The text editing mode navigates a user through the dictated text by highlighting a correction window comprised of a plurality of words comprising a portion of the text. The correction window is comprised of "m" words and the value of m is preferably determined, based upon the voice recognition capabilities of a particular voice recognition engine associated with the dictation system. The greater the ability of the speech recognition engine to recognize and distinguish spoken words, the larger the value of m. A correction vocabulary is defined which consists of the plurality of words which are contained within the correction window and a plurality of correction commands. The voice recognition computer dictation system is configured for processing a spoken utterance which corresponds to an error word contained within the plurality of words highlighted in the correction window is processed. When the error word is spoken by a user it uniquely identifies the word which is to be edited. Thereafter, the error word can be immediately corrected by the user articulating a further voice command.

27 Claims, 12 Drawing Sheets

{Identified word, tag number, vocabulary set indentification...}

METHOD AND APPARATUS FOR FAST VOICE SELECTION OF ERROR WORDS IN DICTATED TEXT

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of computer voice recognition systems for dictation and more particularly to a system for fast voice correction of error words in dictated text.

2. Description of the Related Art

Computer voice recognition dictation systems are designed to allow user data to be entered in a target application program by means of spoken words (e.g. dictation of a report in a word processing application program). Such programs automatically recognize a spoken utterance as a word comprised of a series of characters, and display the word as part of a set of dictated text on a user interface screen. These types of programs are particularly helpful for persons who either lack the physical ability to operate a keyboard and/or computer mouse, or who find it more convenient to dictate documents rather than type them.

One basic problem with computer voice recognition systems for dictation relates to correction of any errors which may occur in the dictated text. Since each word which is entered into a dictated document is generated by a software voice recognition engine, typical errors can include words which are misunderstood by the recognition engine, words which are not contained in the vocabulary of the voice recognition engine, homonyms, or user errors. Correction of such errors with conventional keyboard/mouse controlled document editing systems is typically accomplished by moving a cursor to each location where an error is detected and them making the appropriate correction using the keyboard or mouse controls. This is a relatively simple task in the case of a keyboard/mouse controlled system because the user receives dynamic information regarding the position of the cursor as the mouse or cursor position keys are manipulated. More particularly, the user can visually detect the location of an error word on a computer screen which displays dictated text, and receives direct visual feedback as the cursor is repositioned by manipulation of keyboard and mouse controls. In this way, the user can immediately and accurately position the cursor at the location of the word to be edited.

By comparison, positioning a cursor at the location of an error word using voice commands only, has been a rather tedious task in voice controlled systems of the prior art. Typically, the design of prior art systems has been such that the user can select a word for correction only by using a finite set of specifically recognizable spoken utterances, or voice commands, which cause a cursor to move a predetermined number of increments in a predetermined direction. Usually these voice commands will move the cursor a few words or lines at a time, until it is positioned at the error word to be corrected. This approach is tedious and time consuming because it often requires a user to count the number of words or lines between the present location of the cursor and the error word. Further, it is common that a user will miscount or incorrectly estimate the number of words (or lines) between the cursor and the error words. Such errors commonly result in the need for additional cursor movement commands to place the cursor at the exact position required, and can also result in overshoot and backtracking.

Also, the need to constantly move the cursor using voice commands is distracting to the natural process of proofreading a document. Typically, a reviewer who is proof-reading a document will begin reading the document at a certain point (typically at its beginning) and continue reading to the end. Mistakes or errors are corrected as the erroneous word is encountered in the course of reading through the document. If a user must constantly stop reviewing the document in order to move the cursor to a desired location, the process becomes disjointed and proceeds more slowly. Also, words and sentences may be unintentionally skipped with the result that certain error words may not be detected.

Some voice type computer dictation systems permit correction of the last few dictated words upon recognizing certain voice commands from the user. For example, in some systems, the user can articulate a special command word, such as "Oops" which causes the system to present to the user on the display screen a correction dialog box. The correction dialog box contains the last few dictated words which are displayed separately from the body of the dictated text. Each word in the correction dialog is displayed in a column adjacent to a title word, such as "Word 1", "Word 2", etc. The user then selects the word to be corrected by saying the title word corresponding to the word which requires correction. Finally, any necessary correction can be performed. Obviously, this approach is of limited usefulness as it only permits the last few dictated words to be corrected, and it requires multiple spoken commands.

Finally, while it is theoretically possible to allow a user to identify a word to be corrected in a document by simply speaking the word, such an approach has been found to have a serious problem. In particular, multiple occurrences of the same word within a document, the existence of homonyms, and similar sounding words, all result in practical difficulties in implementing such an approach.

Currently available speech recognition engines and text processors are often unable to consistently discern which word in a document a user is referring when such word is spoken or articulated by a user for correction purposes. Attempting to identify error words in a document comprised of a substantial amount of dictated text inevitably leads to ambiguity and errors with respect to the word that is to be corrected. Once again, this results in an editing process which is both time consuming, tedious and frustrating for a user.

Thus, it would be desirable to provide a method and apparatus for rapid hands-free selection of error words in dictated text. It would also be desirable to provide a method for facilitating accurate hands-free proof reading and correction of a dictated document on a computer. It would further be desirable to provide a method and apparatus by which a computer user of automatic voice dictation software can unambiguously identify a word to be corrected in a document, by simply speaking the word which is to be edited.

SUMMARY OF THE INVENTION

It is an object of this invention to provide a method for fast, hands-free voice selection of error words in dictated text.

It is a further object of this invention to provide a method for facilitating accurate hands-free proof reading and correction of a dictated document on a computer.

It is still a further object of this invention to provide a method for a user to unambiguously identify a word to be corrected in a document, by simply speaking the word which is to be edited.

These and other objects are accomplished by use of the present invention in a speech recognition computer dictation system. The system preferably includes speech recognition engine application software, speech text processor application software configured for operation with the speech recognition engine software, and voice navigator application software for coordinating the operation of the speech text processor and the voice recognition engine. When operated in conjunction with one another, the combination of the voice recognition engine software and the speech text processor permit a user to orally dictate text, which is then automatically entered into a document which appears on a computer screen. In a preferred embodiment according to the present invention, a text editing mode is provided for editing dictated text. Significantly, however, the text editing mode does not require a user to use cursor movement voice commands to increment a cursor a predetermined number of words or lines. Instead, the system described above navigates a user through the dictated text by highlighting a correction window comprised of a plurality of words comprising a portion of the text.

The correction window is comprised of "m" words and the value of m is preferably determined, based upon the speech recognition capabilities of a particular speech recognition engine. The greater the ability of the speech recognition engine to recognize and distinguish spoken words, the larger the value of m. In a preferred embodiment of the invention, a set of correctable words are determined which consist of the plurality of words which are contained within the correction window. The set of correctable words, along with a set of correction commands are provided to the speech recognition engine. The correction commands are words to which the speech text processor application will respond when in the text editing mode, by performing some predetermined editing action. The system is preferably configured for processing a spoken utterance which corresponds to an error word contained within the plurality of words highlighted in the correction window and replacing the error word with a correct word. This can be accomplished either by editing the error word using voice commands or replacing the error word with another word. Once the error word has been corrected, the speech text processor defines a subsequent correction window. The subsequent correction window preferably begins with the word following the error word contained in the previous correction window. In this way, the proofreading and editing process proceeds naturally down through the dictated text.

BRIEF DESCRIPTION OF THE DRAWINGS

There are presently shown in the drawings embodiments which are presently preferred, it being understood, however, that the invention is not limited to the precise arrangements and instrumentalities shown, wherein.

DETAILED DESCRIPTION OF THE INVENTION

Figure 1:
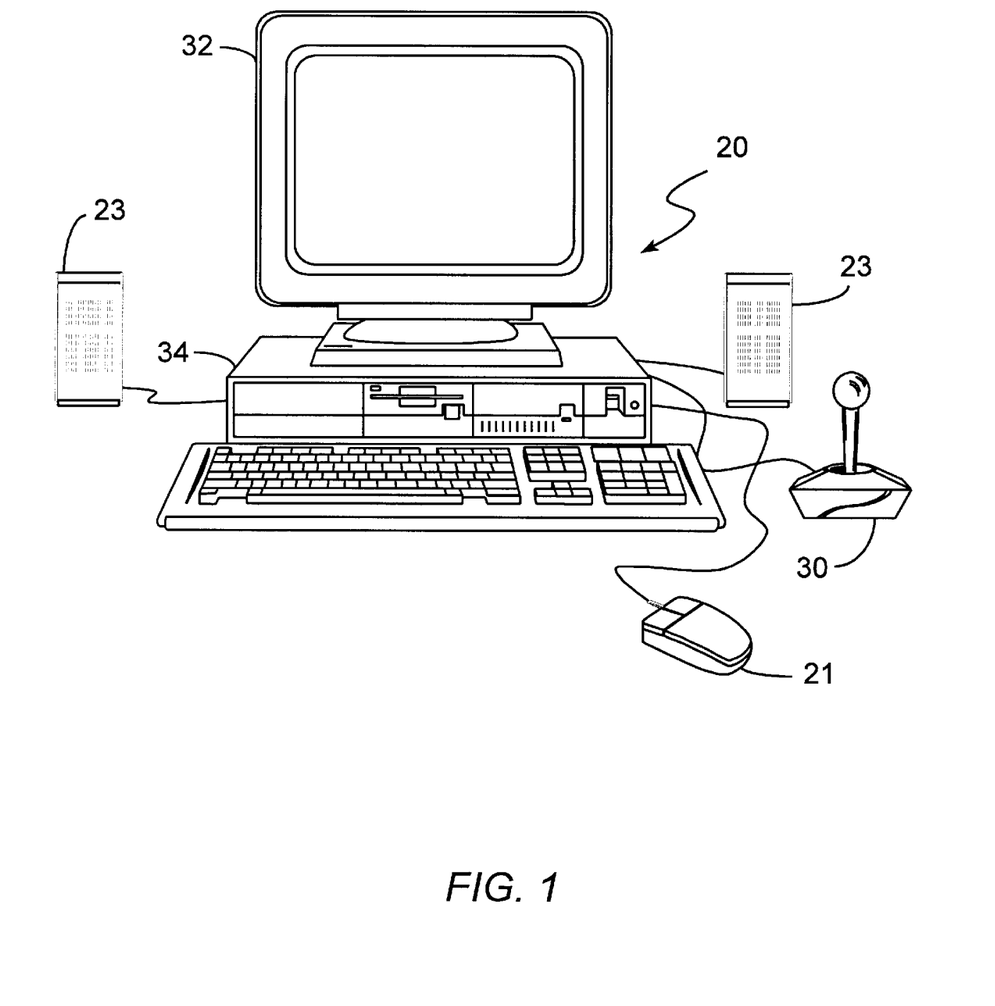
FIG. 1 is a computer system which may be used to implement the present invention.

FIG. 1 shows a typical computer system 20 for use in conjunction with the present invention. The system is preferably comprised of a central processing unit (CPU) 34, including one or more memory devices and associated circuitry, a microphone 30 operatively connected to said computer system through suitable interface circuitry or "sound board" (not shown), and at least one user interface display unit 32 such as a video data terminal (VDT) operatively connected thereto. The CPU can be comprised of any suitable microprocessor or other electronic processing unit, as is well known to those skilled in the art. An example of such a CPU would include the Pentium brand microprocessor available from Intel Corporation or any similar unit such as a 486 or 386 type microprocessor. Speakers 23, as well as an interface device, such as mouse 21, may also be provided with the system, but are not necessary for operation of the invention as described herein.

The various hardware requirements for the computer system as described herein can generally be satisfied by any one of many commercially available high speed multimedia personal computers offered by manufacturers such as Compaq, Hewlett Packard, IBM Corp or Apple Computers.

Figure 2:
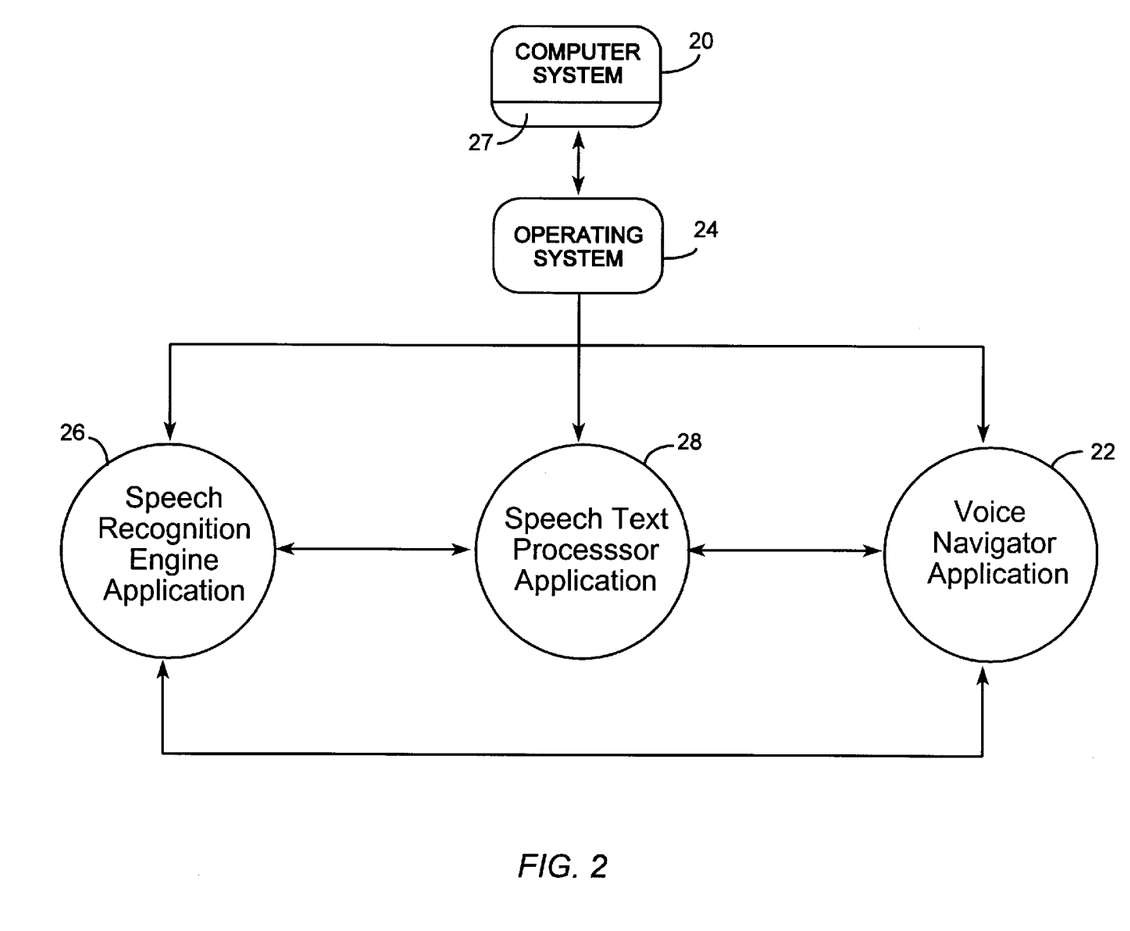
FIG. 2. is a block diagram which illustrates the basic architecture of the system according to the present invention.

FIG. 2 illustrates a typical architecture for a speech controlled dictation system in a computer system 20. As shown in FIG. 2, the system preferably includes an operating system 24, a speech recognition engine application 26, a speech text processor application 28, and a voice navigator application 22. In a preferred embodiment which shall be discussed herein, operating system 24 is one of the Windows family of operating systems, such as Windows 3.1, Windows NT, or Windows 95. However, the system is not limited in this regard, and the invention may also be used with any other type of computer operating system. The system as disclosed herein can be implemented by a programmer, using commercially available development tools for the operating systems described above. As shown in FIG. 2, computer system 20 includes a computer memory device 27, which is preferably comprised of an electronic random access memory and a bulk data storage medium, such as a magnetic disk drive.

In FIG. 2, the speech recognition engine 26, speech text processor 28 and the voice navigator 22 are shown as separate application programs. It should be noted however that the invention is not limited in this regard, and these various application could, of course be implemented as a single, more complex application program. Also, if no other speech controlled application programs are to be operated in conjunction with the speech text processor application and speech recognition engine, then the system may be modified to operate without the voice navigator application. The voice navigator, as described herein, primarily helps coordinate the operation of the speech recognition engine application with the speech text processor.

Figure 3:
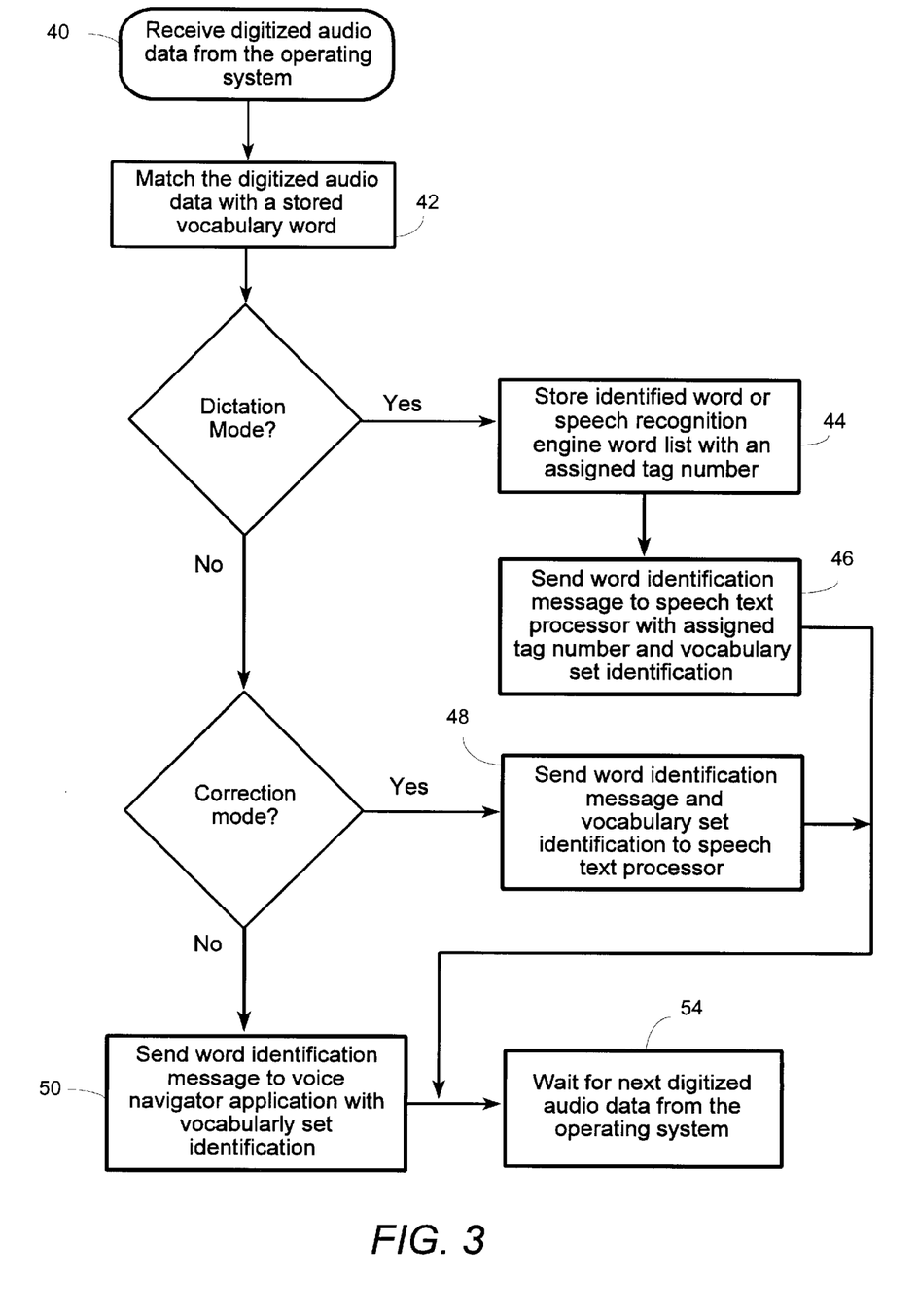
FIG. 3 is a flow chart which illustrates the operation of a speech recognition engine for use in conjunction with the invention.
Figure 4A:
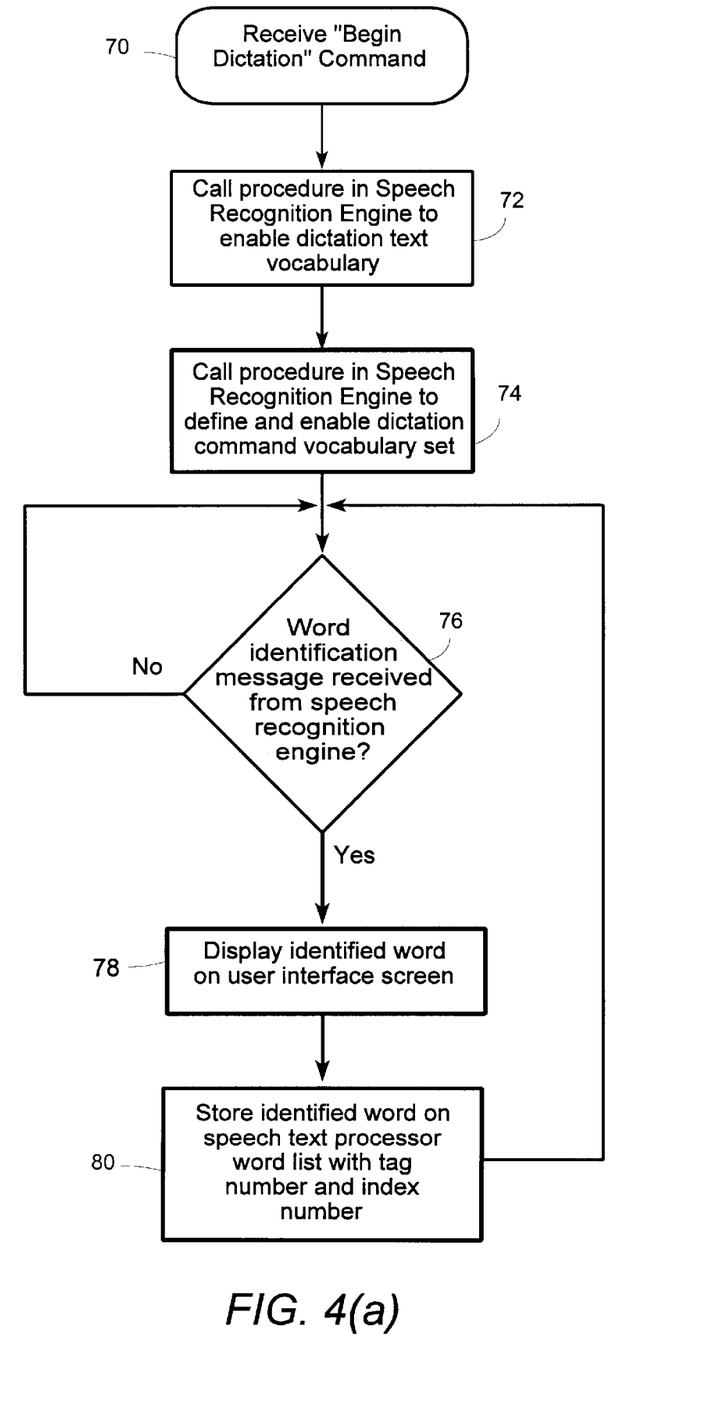
FIG. 4(a) is a flow-chart which illustrates the operation of the speech text processor of the present invention.
Figure 4B:
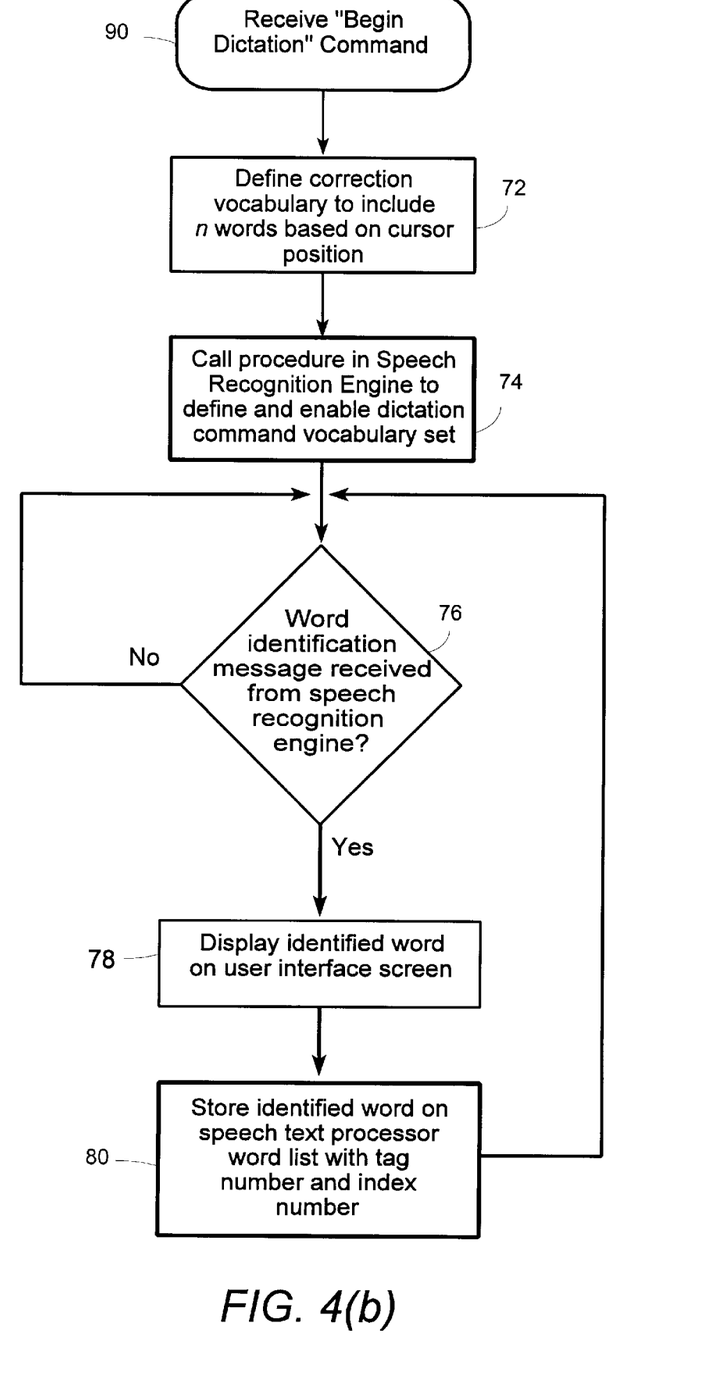
FIG. 4(b) is a continuation of the flow chart of FIG. 4(a).
Figure 4C:
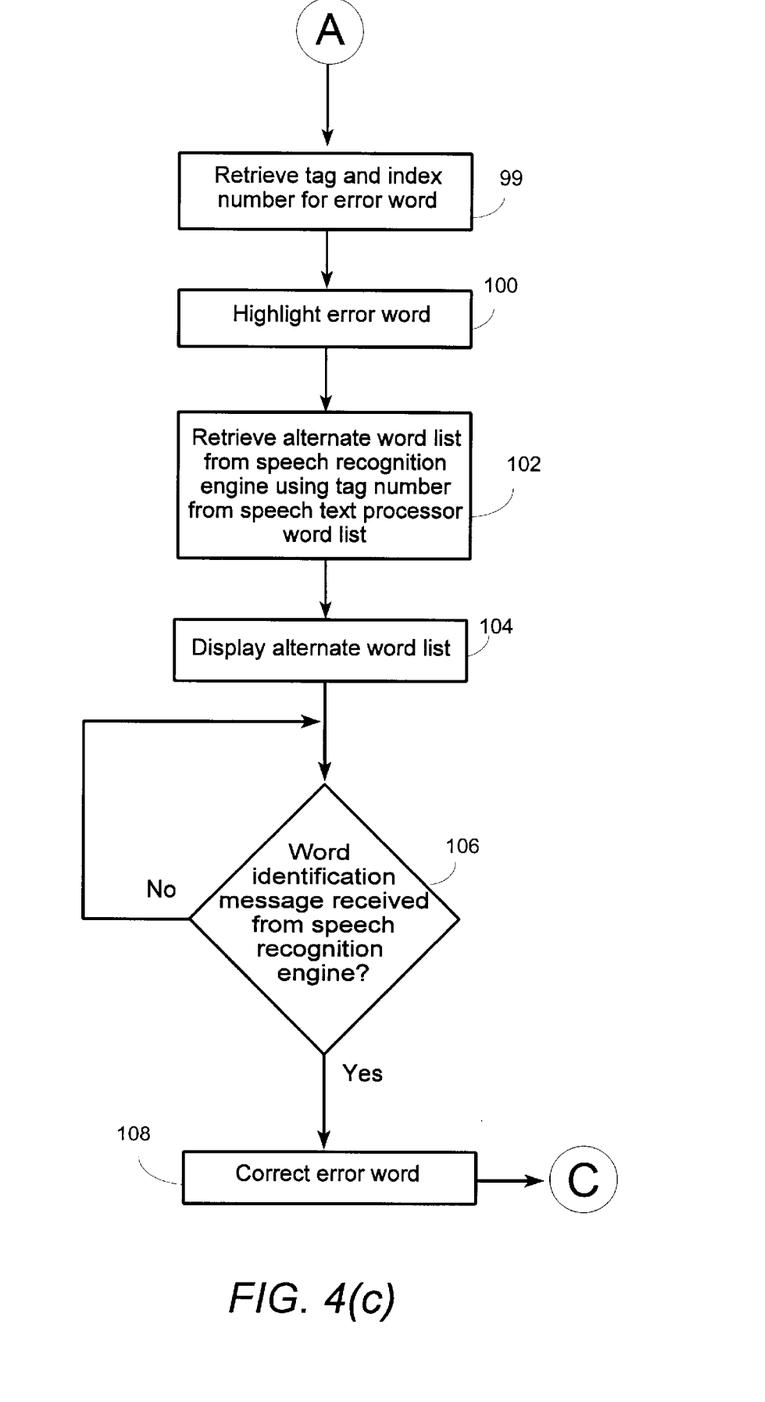
FIG. 4(c) is a continuation of the flow chart of FIG. 4(b).
Figure 5:
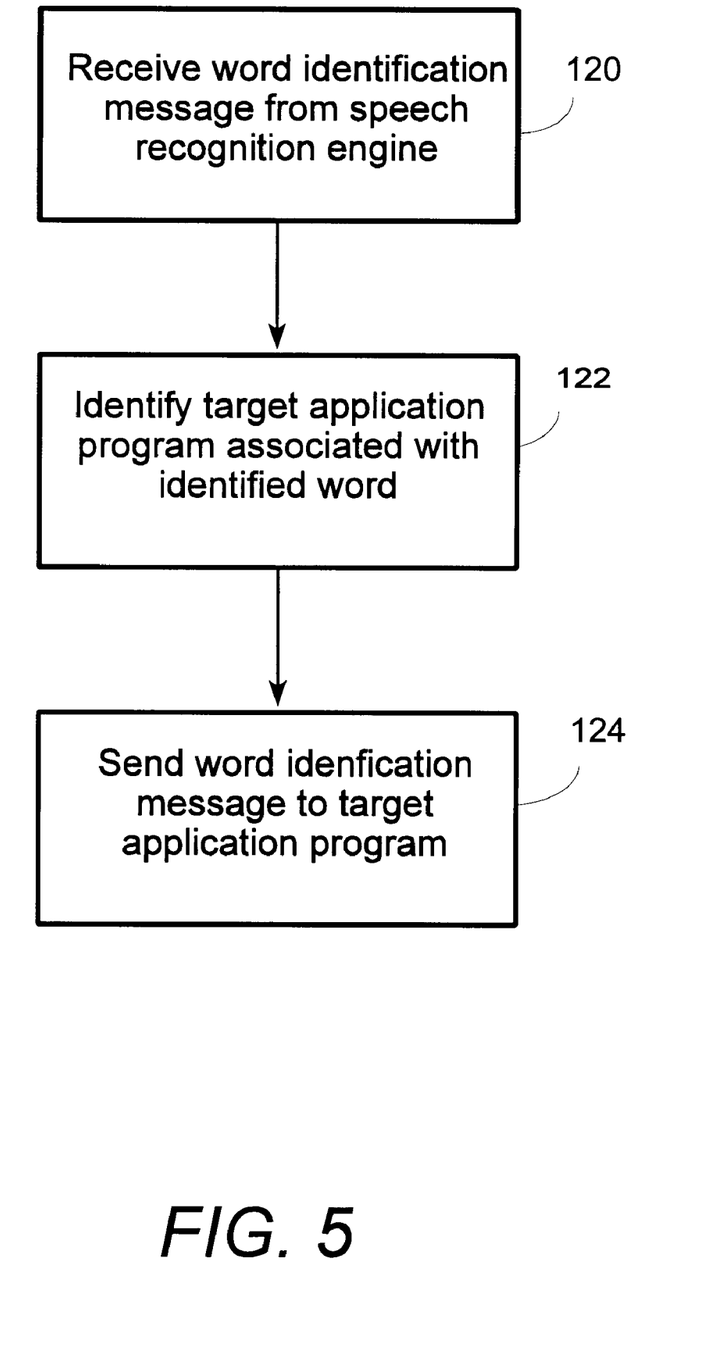
FIG. 5 is a flow chart which illustrates the operation of a voice navigator application for use with the invention.

Referring now to FIGS. 3–5, the basic operation of the fast error correction system of the present invention shall now be described. FIG. 3 is a flow chart illustrating the operation of the speech recognition engine 26, FIG. 4(a)–(c) is a flow chart illustrating the operation of the speech text processor application 28, and FIG. 5 is a flow chart illustrating the operation of the voice navigator application 22 in connection with the invention. With each of the foregoing applications executing on computer system 20, the spoken words "BEGIN DICTATION" or some equivalent command phrase, as articulated by a user, will cause the speech text processor 28 to be placed in a dictation mode. As explained above with respect to computer system 20, such spoken words will be converted to an electronic signal by microphone 30, converted to a digitized format by a sound card interface within computer 20. Thereafter, the digitized audio data will be passed, via the operating system, as a message to the speech recognition engine application 26. In each case where a spoken command is articulated by a user, this process will occur in the same way. Accordingly, for the purposes of improved clarity, the description of the process will be omitted hereafter.

As shown in steps 40 and 42 in FIG. 3, when digitized audio data representing a particular word is received by the speech recognition engine 26, the speech recognition engine will identify such audio data as a word which is in its vocabulary. For the purposes of this disclosure, the term "word" as used herein shall be used to refer to either a single word, or a combination of words forming a phrase (such as "BEGIN DICTATION"). The list of words which are recognizable by the speech recognition engine are generally maintained in computer memory 27. These words can include command words which are specific to a particular application, as well as a set of dictation vocabulary words which are recognizable to the speech recognition engine when operating in the dictation mode. Where the speech recognition engine is required to recognize words for more than one application, the various vocabulary sets are preferably stored on a magnetic disk, and only the active vocabulary and/or command will be stored in RAM. When a particular speech enabled application is active, the vocabulary for that application can be retrieved from disk and stored in electronic RAM. The speech recognition engine will compare each digitized word spoken by a user to its list of words in order to determine the most likely match. Once it has identified a spoken word, the speech recognition engine 26 will, pass a word identification message to a predetermined application program executing on computer system 20. In its default configuration, the speech recognition engine will pass a word identification message to the voice navigator application 22 as shown in step 50.

In a preferred embodiment, the voice navigator application 22 maintains a list of command words which are associated with each of the voice enabled application programs which are currently executing on the computer system. As shown in FIG. 5, when the voice navigator 22 receives a word in step 1 20, it identifies such word with a particular application program in step 122. Subsequently, in step 124, it passes a word identification message to the target application program so identified. In a preferred embodiment, the application program is configured so that after receiving the initial word identification message from the voice navigator, the application program will send a message to the speech recognition engine 26, thereby causing subsequent word identification messages from the speech recognition engine 26 to be passed to the new target application program.

In the present case, when the speech recognition engine sends a message to the voice navigator 22 indicating that the word "BEGIN DICTATION" has been identified, the voice navigator will recognize the word as a command for the speech text processor application 28. Thus, the message from the speech recognition engine identifying the "BEGIN DICTATION" command will be sent by the voice navigator 22 to the speech text processor 28. Upon receipt of such message, the speech text processor 28 will cause subsequent word identification messages generated by the speech recognition engine to be sent to the speech text processor 28. In a preferred embodiment, this result can be accomplished by the speech text processor calling a procedure in the speech recognition engine and specifying a new address for word identification messages sent by the speech recognition engine.

As shown in FIG. 4, when the speech text processor 28 receives in step 70 the message from the voice navigator 22 which indicates that the speech recognition engine has identified the "BEGIN DICTATION" command, it causes the speech text processor to enter dictation mode. When this occurs, the speech text processor in step 72 calls a procedure in the speech recognition engine 26, which enables a dictation text vocabulary. The text vocabulary is a set of spoken words which the speech engine can recognize when it is in dictation mode. In a preferred embodiment, the vocabulary is stored as a data file on a data storage medium such as a magnetic disk which is accessed by the speech recognition engine when the dictation text vocabulary is enabled. In addition, the speech text processor in step 74 calls one or more additional procedures in the speech engine to define and enable a dictation command vocabulary set. After these steps are completed, the speech text processor 28 and the speech recognition engine 26 are ready to begin accepting voice dictation.

Figure 7:
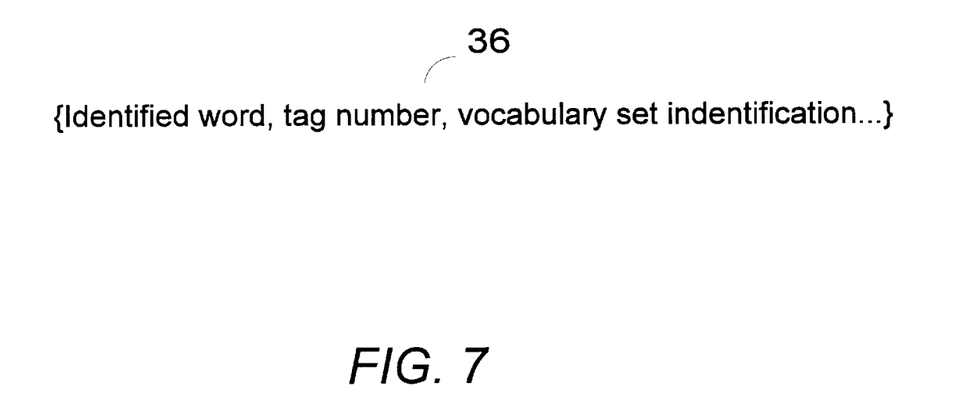
FIG. 7 is an example of a word identification message.

In dictation mode, whenever the speech recognition engine 26 identifies a spoken utterance as a word within the dictation text vocabulary, it will send a word identification message 36 to the speech text processor application 28. In FIG. 3 and 4, this is shown in steps 46 and 76, respectively. For example, in a Windows based operating system, the message may be sent utilizing the "SendMessage( )" API, which the operating system provides for these types purposes. As shown in FIG. 7, the identified word is passed from the speech recognition engine 26 to the speech text processor as one of several message parameters. As an additional message parameter, a word tag is preferably included, which is typically some value assigned to the specific word by the speech recognition engine and which allows the word to be uniquely identified from all others in a document, including identical words which are subsequently dictated by a user. Finally, a further parameter is included which identifies to the speech recognition engine the vocabulary set (i.e., dictation text or command) from which the identified word was located. Other parameters may also be included in the word identification message from the speech recognition engine; for greater clarity however, these have been omitted in FIG. 7. As each word is identified to the speech text processor 28 in a word identification message from the speech recognition engine 26, it is subsequently caused by the text processor 28 to be displayed at step 78 on the computer interface screen 20. Each word is caused by the speech text processor to be displayed as part of a document comprised of dictated text, by making use of existing API's contained in operating system 24..

When a word identification message containing a command word is received by the speech text processor, it will cause the speech text processor perform certain pre-designated functions, e.g., "stop dictation" (to end dictation), "begin spell" (to spell a word, character by character), "begin numbers" (to enter numerical characters), "begin correction" (to initiate correction mode).

Figure 6A:
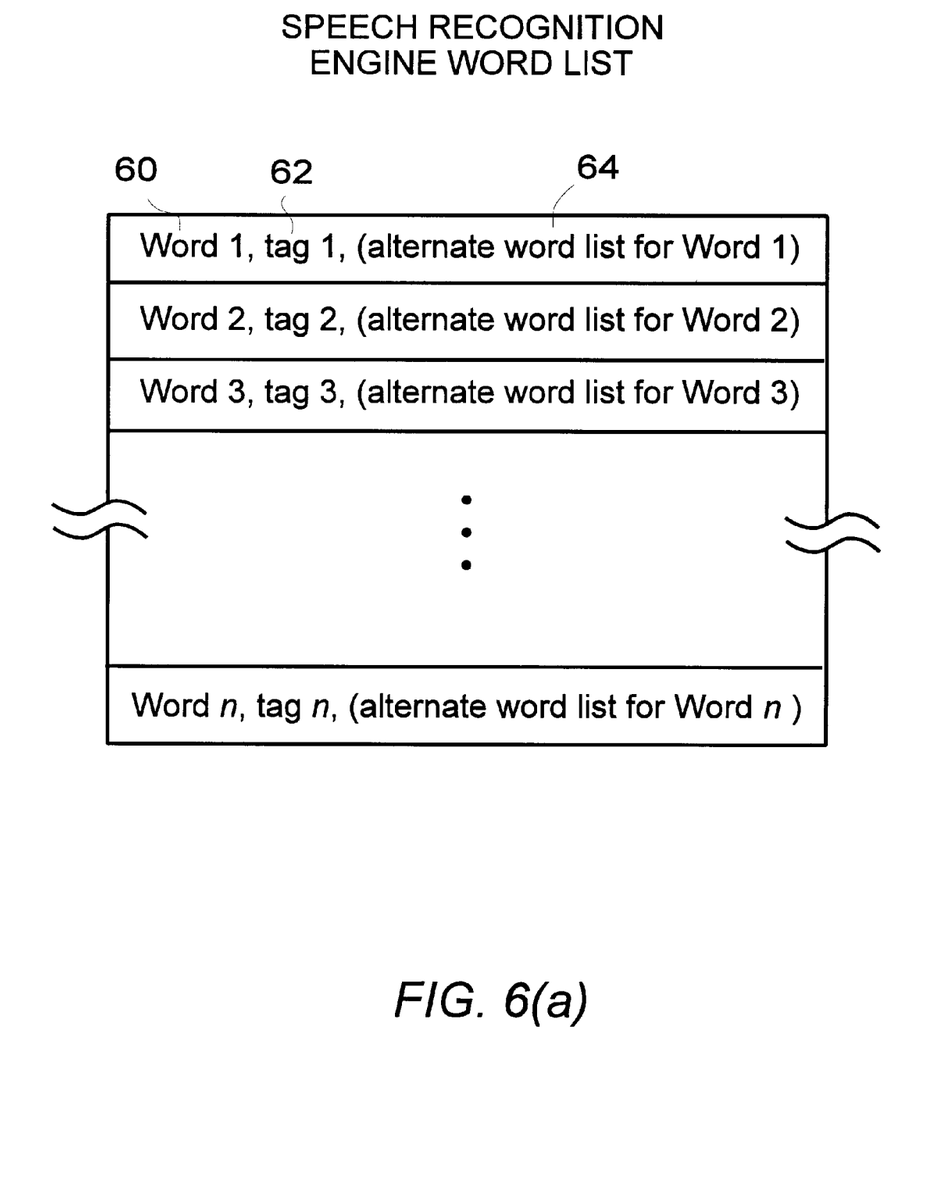
FIG. 6(a) is an example of a word list maintained by the Speech Recognition Engine.
Figure 6B:
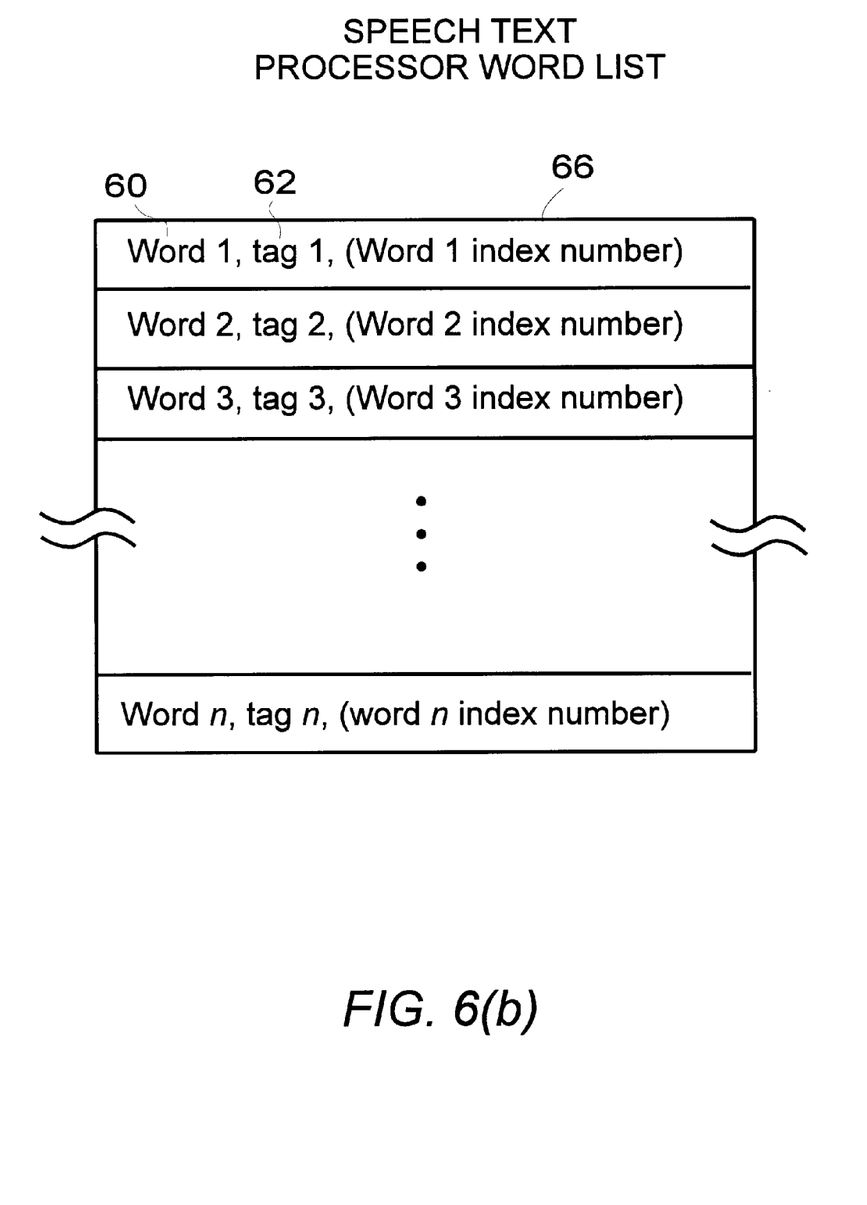
FIG. 6(b) is a word list maintained by the Speech Text Processor.

As shown in FIG. 3, at step 44 and in FIG. 4(a) at step 80, the speech recognition engine 26 and the speech text processor 28 each maintain a list containing words which have been identified in the course of the dictation process. In each list, identified words 60 are correlated with their assigned tags 62. FIG. 6(a) is an example of a word list maintained by the speech recognition engine and FIG. 6(b) is an example of a word list maintained by the speech text processor. In addition to a list of identified words 60 and their assigned tags 62, the speech engine 26 also maintains as part of its list, an alternate word list 64. The alternate word list is typically comprised of words which may sound similar to the word the speech recognition engine has identified. Essentially, the words contained in the alternate word list are the less preferred word identification choices which were also considered by the speech recognition engine when it attempted to identify a particular word spoken by a user. In some cases, the identified word 60 selected by the voice recognition engine is an error, and one of the words contained on the alternate word list 64 is actually the word which was spoken by a user. As shown in FIG. 6(a), the list of alternate words 64 is stored together with the list of identified words and their assigned tags 62.

In addition to the identified word 60 and its tag 62, the speech text processor 28 also stores as part of its word list a word index number 66. This index number preferably corresponds to an index number assigned by the operating system to the words that it displays on screen. This indexing system is typically provided by operating systems for the benefit of text based application programs. In the case of the Windows family of operating systems, the indexing system is incorporated into a set of operating system APIs which include EM_GetSel( ), EM_SetSel( ) and EM_ReplaceSel( ). The indexing system is important as it identifies uniquely where a particular word appears on a computer interface screen or VDT. The speech text processor can get the index number of the word closest to a displayed cursor, for example, by calling the Windows API "EM_GetSel( ). Subsequently, the text at the particular index number so identified can be replaced using the EM_ReplaceSel( ) API.

When a user has finished dictating, the user can articulate a command such as "STOP DICTATION" or some equivalent. The speech recognition engine 26 is configure so that such a word, when spoken by a user, will be identified as a dictation command word. Accordingly, a word identification message will then be sent to the speech text processor indicating that such word has been identified from the command vocabulary (see FIG. 7). When the speech text processor 28 receives such message, it will call a procedure in the speech recognition engine 26 which will cause all subsequent voice identification messages from the engine to again be sent to the voice navigator 22, thereby returning the system to its default configuration. If the user then articulates the command "BEGIN CORRECTION" or some equivalent, the voice navigator 22 will pass such word identification message to the speech text processor 28, which will then call a procedure contained within speech recognition engine 26 so that subsequent voice identification messages are again sent to the speech text processor 28.

When the speech text processor 28 receives the command "BEGIN CORRECTION", it will define a correction vocabulary based upon the current cursor position as shown in step 92 of FIG. 4(b). The correction vocabulary is preferably comprised of the set of words contained on the speech text processor word list following the current cursor position on the user interface screen and including the following m words. It should be understood, however, that the invention is not limited in this regard, and the correction vocabulary may be comprised of the group of words contained on the particular line of text corresponding to the current cursor position, and some number of additional lines following. In fact, the system may be configured to select a correction vocabulary at any point in the dictated document, as may be selected by the programmer. Further, the system is preferably configure so that said speech text processor is responsive to user correction commands to choose a different set of words for the correction vocabulary.

The word on the word list which is closest to the current cursor position is determined by locating the word on the list with an index number closest to the current cursor position. The speech text processor obtains the index number of the word closest to the cursor displayed on the screen by making use of the EM-GetSel( ) API (in the case of a Windows type operating system). Once this index number is determined, the speech text processor can search its word list, and finds the word with the closest index number. In a preferred embodiment, the correction vocabulary, consisting of the m words following the word with the matching index number, are sent (preferably as a message parameter) to the speech recognition engine 26. This process is shown in step 96 in FIG. 4(b). Further, the speech text processor 28 calls one or more additional procedures contained in the speech recognition engine 26 to define and enable a correction command vocabulary.

Figure 8:
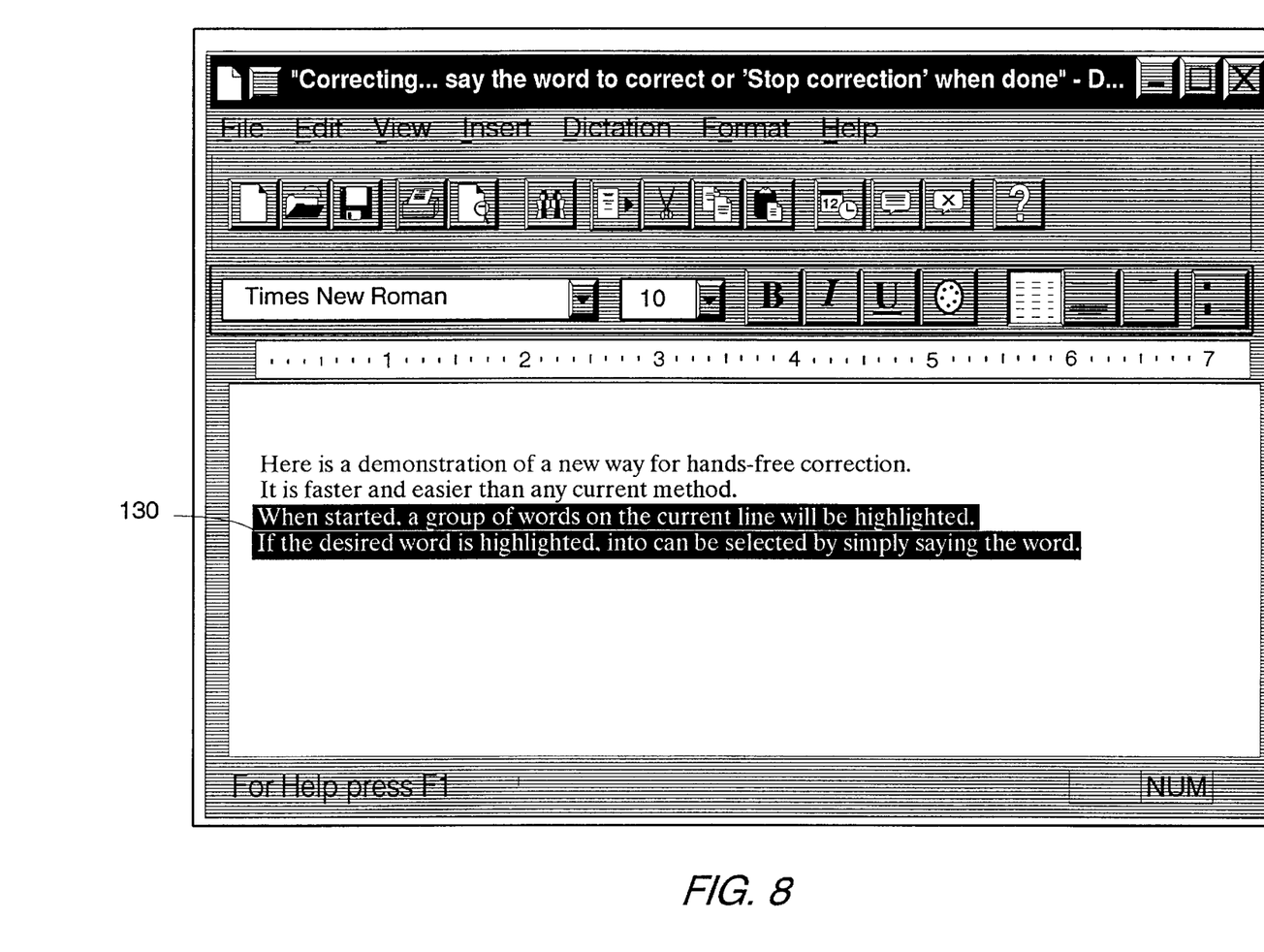
FIG. 8 is a screen display which shows a section of dictated text, with a highlighted portion.

Subsequently, speech text processor 28 will demarcate or highlight a correction region in step 94 which contains the correction vocabulary. The speech text processor highlights the words in the correction vocabulary set on the user interface screen so as to identify to the user the particular words which are currently available for correction. An example of such highlighting is shown in FIG. 8, as designated by reference numeral 130. Significantly, however, other highlighting techniques may also be used, such as underlining, bold text, different color text, etc. If a user wishes to choose a different correction vocabulary, the highlighted correction region can be repositioned by moving the cursor with available user commands. For example, correction commands may include "next selection" (for moving the cursor past the end of the current highlighted set of correction words), "previous selection" (for moving the cursor to a position m words preceding the present set of highlighted correction words), "top of document" (for moving a cursor to the beginning of text), etc. The specific words chosen for the correction commands may be selected based upon user convenience considerations, and the invention is not limited in this regard. Once the foregoing initialization process is completed, the speech recognition engine 26 and the speech text processor 28 are considered to be in a correction mode, and ready to begin correcting the dictated text.

In the correction mode, when the speech recognition engine 26 identifies a spoken utterance that matches a word from the current correction vocabulary, a word identification message, of the format shown in FIG. 7, is sent from the speech recognition engine 26 to the speech text processor 28. See FIG. 3, step 48. In this case, since only a limited set of m words are contained within the correction vocabulary set, a tag is not needed to uniquely identify the particular word which has been spoken and the tag field is therefore ignored. After receipt of the identified word in step 98, hereinafter referred to as the "error word", the speech text processor 28 matches such error word in step 99 with a word on the speech text processor word list shown in FIG. 6. More particularly, the error word is matched with one of the words in a sub-set of the speech text processor word list comprised of the highlighted correction word set. If the error word appears more than once in the correction word set, the speech text processor matches the error word to the first occurrence of such word. By matching the error word to a word contained on the speech text processor word list, the speech text processor 28 can obtain a word index number 66 from which the position of such word on display unit 34 can be uniquely identified. In addition, the speech text processor also can obtain a tag number for the particular word.

Using the word index number, the speech text processor preferably causes the screen display to be redrawn in step 100 so that only the word matching the error word is highlighted as indicated by reference numeral 132. See FIG. 9. In addition, the speech text processor 28 initiates a call in step 102 to a procedure contained within the speech recognition engine 26, which requests the speech recognition engine 26 to identify the words contained in the alternate word list 64 for the word matching the tag number of the error word.

After the alternate word list is returned to the speech text processor 28 by the speech recognition engine, the speech text processor preferably makes use of an existing operating system API in step 104 to display a dialog box 134. The dialog box preferably lists: 1) the alternate words with an associated key number or phrase; 2) the edit command words 138 which are available to the user; and 3) an entry field 140 which identifies the error word to be corrected. The correction dialog box 134 is shown in FIG. 9 with the screen redrawn to highlight the error word.

If the correct word appears in the alternate list provided by the voice recognition engine, a user may speak the key number or phrase associated with that word. When the speech text processor 28 receives a word identification message in step 106 indicating that one of the key numbers has been spoken by a user, it will cause the error word to be replaced on screen in step 108 by the alternate word associated with such key number. In addition, the alternate word will be inserted in place of the error word in the speech text processor word list shown in FIG. 6(b), and in the speech recognition engine word list. In a preferred embodiment, the speech text processor will also notify the speech recognition engine so that future errors may be avoided. The foregoing process will be repeated until corrections are completed.

If the correct word does not appear on the alternate list provided by the voice recognition engine,the user can use the command "Begin Spell", which will delete the word in the entry field 140 of the dialog box 134. The "Begin Spell" command will also place the speech engine and speech text processor into a spell mode whereby the system will recognize spoken letters, thereby allowing the user to spell out the desired word, one letter at a time.

Figure 9:
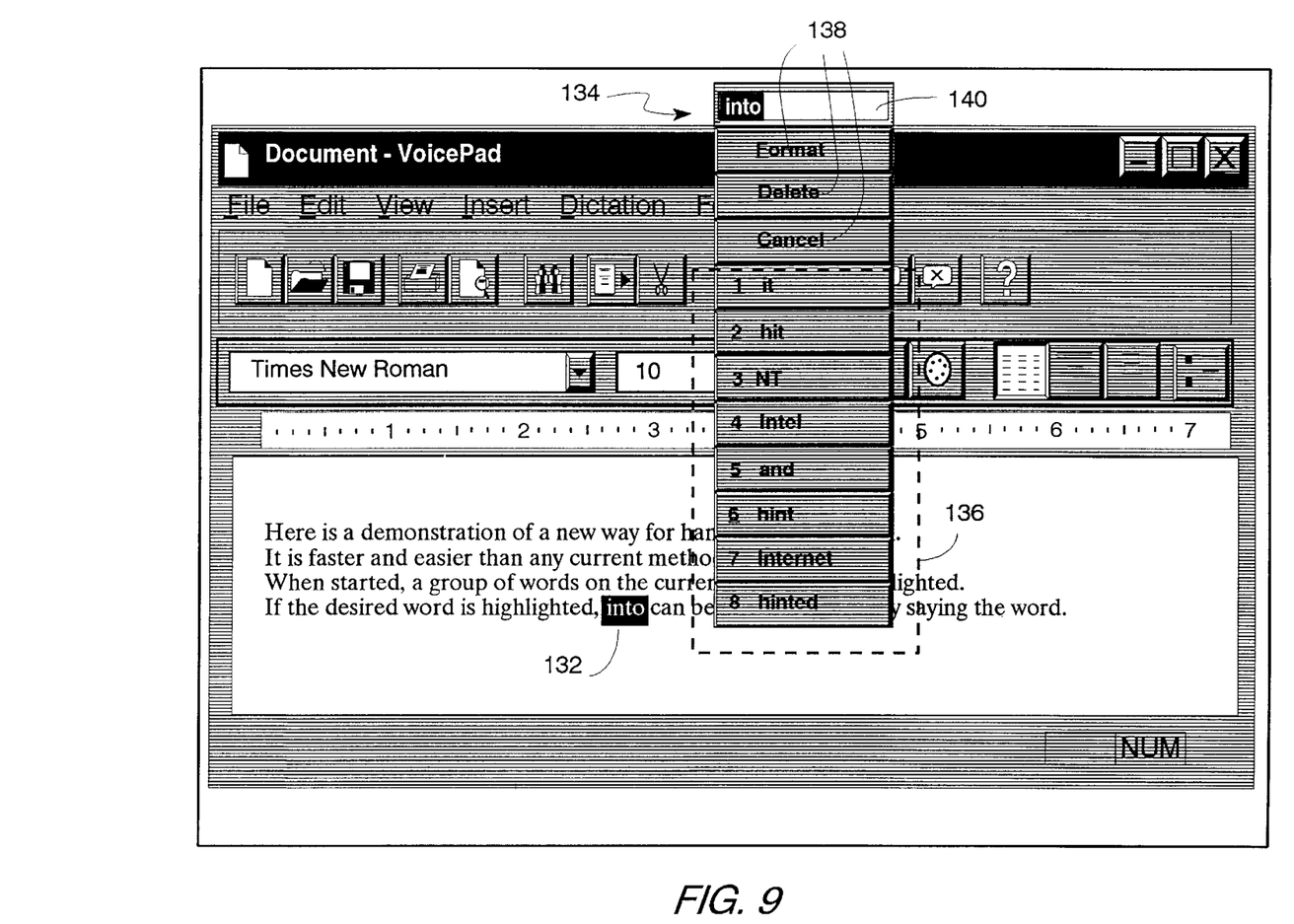
FIG. 9 is a screen display which shows a section of dictated text, with a highlighted portion and a correction dialog box.

In the example shown in FIG. 9, the edit command words in the correction dialog box are "FORMAT" (to invoke a formatting option such as "capitalize, upper-case, etc), "DELETE" (deletes the word in the document and closes the dialog box) and "CANCEL" (closes the dialog box without performing an action). It should be understood however, that any desired edit command words can be used to perform a suitable editing function and the invention is not limited in this regard.

Significantly, the optimal value of m (i.e. the number of words in the correction vocabulary) is preferably determined based upon the capabilities of the speech recognition engine 26. In particular, m is preferably determined by statistical evaluation of the recognition engine's performance, to be large enough so as to include in the correction window at least one occurrence of a word which requires correction in the case of previously unedited text which has been dictated. For example, if the speech recognition engine identifies spoken words correctly 98% of the time, then an error will occur in about one (1) out of every fifty (50) words. In this case, it would be desirable to set m to approximately 50. Thus, there will be a reasonable likelihood that the correction window will be large enough to include at least one error.

Conversely, the value of m is statistically determined, so that it is small enough to avoid frequent errors or ambiguities with respect to the identification of a word which requires correction. Experimental studies of currently available speech recognition engines indicates that an optimal value of m is between approximately 10 and 50, wherein m increases with improved speech recognition engine performance. The system can be configured so that the value of m is fixed or to permit a user to select the value.

With the above-described invention, it is possible to efficiently and accurately correct dictated text, using voice commands only. The proof-reader begins the correction process by articulating the appropriate voice command for placing the speech text processor in correction mode. This will cause the m-word correction window to be highlighted for review. The proof-reader indicates which words in the correction window are to be corrected by simply speaking the word. Upon completion of the correction process, the speech text processor highlights the next group of m-words automatically, and the process is repeated until all of the text has been reviewed. If their are no words which require correction in a particular correction window, the user can choose the next correction window selection of m words by an appropriate command such as "next selection". When all corrections are complete, the user can return to dictation mode with another correction command such as "stop correction".

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

We claim:

1. In a computer system (20) having an operating system (24), a memory (27), and processing means (26, 28) for receiving spoken words and converting said spoken words to words for storage in said memory (27) and for display on a visual display (32), a method for voice-activated correction of text, said method comprising:

(a) storing in said memory (27) a plurality of words (60) corresponding to said spoken words which are enabled for correction by voice activation, alternate word lists containing alternate words which are also likely matches for each spoken word, and a plurality of correction commands;

(b) displaying one or more of the words (60) enabled for correction in a first demarcated correction region (130) on the visual display (32) in response to one of said plurality of correction commands being spoken by a user, said demarcated correction region identifying words which are available for a user to say and correct;

(c) receiving and identifying in the processing means (26, 28), an error word (132) spoken by a user and matching said spoken error word to a word which exists in said demarcated correction region;

(d) operating said processing means (26, 28) to retrieve from said memory (27) and to display on said visual display (32), one or more alternate words (136) from said alternate word list for said error word as potential replacements for said error word (132);

(e) receiving and identifying in the processing means (26, 28) a second one of said plurality of correction commands, in response to said second one of said plurality of correction commands (136, 138) being spoken by a user; and wherein the processing means (26, 28) is responsive to said second one of said plurality of correction commands to correct the error word on the visual display.

2. The method according to claim 1, further comprising the steps of (e) displaying a subsequent demarcated correction region, said subsequent demarcated correction region beginning with a word following the error word contained in the first demarcated correction region (130), and (f) repeating steps (c)–(e) for the subsequent demarcated correction region until the correction of text is completed.

3. The method according to claim 1, wherein said first demarcated correction region (130) begins at a position where a cursor is initially displayed on said user interface screen when the voice activated correction process is initiated.

4. The method according to claim 1, wherein said demarcated correction region (130) begins at a line of text where a cursor is currently displayed on said user interface screen.

5. The method according to claim 1 wherein the one or more words enabled for correction may be user selected by correction commands which reposition said demarcated correction region (130).

6. The method according to claim 1 wherein said one or more words enabled for correction are demarcated by drawing a thin line border around the text.

7. The method according to claim 1 wherein said one or more words enabled for correction are demarcated by drawing a thin line adjacent to said words.

8. The method according to claim 1 wherein said one or more words enabled for correction are demarcated by displaying said words in a color which is different from the remainder of the words enabled for correction.

9. The method according to claim 1 wherein said text is demarcated by underlining.

10. The method according to claim 1 wherein said first demarcated correction region is comprised of m words and the value of m is statistically determined, based upon the voice recognition capabilities of the voice recognition engine, to be large enough so as to include at least one occurrence of a word which requires correction in the case of previously unedited text which has been dictated.

11. The method according to claim 10 wherein the value of m is statistically determined, based upon the voice recognition capabilities of the voice recognition engine, to avoid frequent misidentification of a word which requires correction.

12. The method according to claim 11 wherein the value of m is equal to between about 10 and 50.

13. The method according to claim 1 wherein said processing means is comprised of a speech recognition engine (26) and a speech text processor (28).

14. The method according to claim 13 wherein said processing means is further comprised of a voice navigator application (22) for coordinating the operation of said speech recognition engine (26), the speech text processor (28) and any other application programs executing on said computer system.

15. The method according to claim 13 wherein said speech recognition engine (26) converts a spoken word to text, and identifies said spoken word to said speech text processor in a word identification message which includes a tag value.

16. The method according to claim 13 further comprising the steps of:

assigning a unique tag value to each word converted to text by said speech recognition engine and providing said tag value to said speech text processor.

17. The method according to claim 16 further comprising the step of storing in memory (27) a word list for each of said speech recognition engine and said speech text processor, each of said word lists being comprised of a list of words (60) converted to text by said speech recognition engine ((26) and the tag values (62) assigned to each word.

18. The method according to claim 17 further comprising the steps of storing in memory (27) as part of said word list for said speech recognition engine, an alternate word list (64) comprised of words identified by said speech recognition engine (26) as possible alternative matches to each of said spoken words, and storing in memory as part of said word list for said speech text processor a word index number (66) for each word, said word index number (66) uniquely identifying a position of each word in a document.

19. The method according to claim 18 wherein said alternate words (64) are obtained by said speech text processor (28) for presentation on said visual display (32) by the further steps of:

identifying said error word by matching a word spoken by a user to one of said words enabled for correction in said demarcated correction region (130);

retrieving from the word list of said speech text processor a tag value (62) for the error word (132); and retrieving from said word list of said speech recognition engine the alternate word list (64) for the word uniquely identified by said tag value (62).

20. In a computer system (20) having an operating system (24), a computer memory (27), and a user interface display (32), an apparatus for voice-activated correction of text, said apparatus comprising:

(a) means for storing in said memory (27) a plurality of words (60) corresponding to words spoken by a user which are enabled for correction by voice activation, alternate word lists containing alternate words which are also likely matches for each spoken word, and a plurality of voice activated correction commands;

(b) means for displaying one or more of the words (60) enabled for correction in a first demarcated correction region (130) on the visual display (32), said demarcated correction region identifying words which are available for a user to say and correct;

(c) means for receiving and identifying an error word (132) to be corrected when said error word is spoken by a user, said error word (132) being contained within said demarcated correction region, and matching said word to a word which exists in said demarcated correction region;

(d) means for retrieving from said memory and displaying on said visual display (32) one or more alternate words (136) from said alternate word list for said error word as potential replacements for said error word;

(e) means responsive to one of said plurality of correction commands being spoken by a user, for correcting the error word on the visual display.

21. The apparatus according to claim 20 wherein the means for displaying said one or more of the words enabled for correction in a first demarcated correction region (130) on the visual display (32) is configured to display a subsequent demarcated correction region after said error word (132) has been corrected.

22. The apparatus according to claim 21 wherein said demarcated correction region is comprised of m words.

23. The apparatus according to claim 21 wherein said system is configured to permit a subsequent error word in said subsequent demarcated correction region to be corrected.

24. In a computer system having an operating system, a memory, and processing means for receiving spoken words and converting spoken words to text words for storage in memory and display on a visual display, an apparatus for voice-activated correction of text, said apparatus comprising:

(a) text processing means for
  (1) selecting a first set of correction words enabled for voice activated correction from the text words stored in said memory,
  (2) for enabling a first group of voice activated correction commands, and
  (3) for displaying the first set of correction words in a first demarcated correction region on the visual display;

(b) means for receiving and storing in said memory (27) an error word (132), when said error word (132) is spoken by a user, and for communicating said error word (132) to said text processing means;

(c) means for matching said error word (132) with one of said correction words;

(d) means for displaying a list of alternate words (64) on the visual display (32) of the computer system (20) in response to said error word (132) being spoken, said alternate word list created for each word spoken during a dictation mode, said alternate word list containing alternate words which are also likely matches for said spoken error word;

(e) means for receiving and storing a spoken correction command (136, 138) in the computer system to replace said error word with a word contained on said alternate word list;

whereby said computer system is responsive to the spoken correction command to correct the error word on the visual display.

25. The apparatus according to claim 24 further comprising means for selecting a subsequent set of correction words from the text words stored in said memory, said subsequent set of correction words enabled for voice activated correction, and for displaying the subsequent set of correction words in a subsequent demarcated correction region on the visual display for correction.

26. The apparatus according to claim 24 wherein said spoken correction command is a unique character associated with one of said alternate words (64).

27. The apparatus according to claim 25 wherein said subsequent demarcated correction region is comprised of m words and begins with the word following the error word contained in the first demarcated correction region.

* * * * *